(12) United States Patent
Osakabe et al.

(10) Patent No.: US 6,539,094 B1
(45) Date of Patent: Mar. 25, 2003

(54) DATA TRANSMISSION APPARATUS AND METHOD, DATA RECEIVING APPARATUS AND METHOD, AND DATA TRANSMITTING/RECEIVING SYSTEM AND METHOD

(75) Inventors: Yoshio Osakabe, Kanagawa (JP); Makoto Sato, Tokyo (JP); Yoshitomo Osawa, Kanagawa (JP); Tomoyuki Asano, Kanagawa (JP); Ryuji Ishiguro, Tokyo (JP); Hisato Shima, Saratoga, CA (US)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/059,762

(22) Filed: Apr. 14, 1998

(30) Foreign Application Priority Data

Apr. 23, 1997 (JP) .............................. 9-106105

(51) Int. Cl.[7] ................................. H04L 9/00
(52) U.S. Cl. ..................... 380/283; 380/44; 380/270; 713/160
(58) Field of Search ................. 713/160, 161, 713/200, 201, 168; 380/223, 227, 228, 277–283, 44, 45

(56) References Cited

U.S. PATENT DOCUMENTS 4,203,166 A * 5/1980 Ehrsam et al. ................ 380/45
6,105,012 A * 8/2000 Chang et al. .................. 705/64

FOREIGN PATENT DOCUMENTS

| EP | 0 756 276 | 1/1997 |
| EP | 0 765 061 | 3/1997 |
| EP | 0765061 A2 * | 3/1997 ........... H04L/29/06 |

OTHER PUBLICATIONS

Kunzman Adam, 1394 high performance serial bus: the digital interface for ATV, vol. 41, Aug. 1995, p. 893–900.*
Bloks R H J: "The IEEE–1394 high speed serial bus" Philips Journal of Research, vol. 50, No. 1, Jan. 1, 1996, p. 209–216 XP004008212 ISSN: 0165–5817.
Kunzman A J et al: "1394 High Performance Serial Bus: The Digital Interface For ATV" IEEE Transactions on Consumer Electronics, vol. 41, No. 3, Aug. 1, 1995 pp. 893–900, XP000539552 ISSN: 0098–3063.

* cited by examiner

*Primary Examiner*—Gail Hayes
*Assistant Examiner*—Ho S. Song
(74) *Attorney, Agent, or Firm*—Frommer Lawrence & Haug LLP; William S. Frommer; Glenn F. Savit

(57) ABSTRACT

Data to be transmitted via a serial bus in conformity with the IEEE 1394 protocol are ciphered by a ciphering/deciphering circuit, and headers are attached thereto by a header sync detecting/generating circuit. And after further attachment of CRC code by a CRC detector/generator, the data are packetized into isochronous packets of an isochronous mode by a transmission/reception switching circuit, whereby transmission of the data can be performed with enhanced security. Out of cipher keys employed, a session key invariable in each session of the data is transmitted in each packet of an asynchronous mode, and a time variable updated in each session is transmitted in each packet of an isochronous mode. And the ciphered data obtained by depacketizing the packets of the isochronous mode are deciphered, so that the data transmitted with security can be deciphered exactly, and thus illegal use of the data can be prevented with certainty.

28 Claims, 6 Drawing Sheets

CYCLE START PRIMARY PACKET FORMAT

DATA TRANSMISSION APPARATUS AND METHOD, DATA RECEIVING APPARATUS AND METHOD, AND DATA TRANSMITTING/RECEIVING SYSTEM AND METHOD

BACKGROUND OF THE INVENTION

1. Field of the Invention

The present invention relates to a data transmitting apparatus and method, a data receiving apparatus and method, and a data transmitting/receiving system and method, and more particularly to those adapted to prevent illegal use of data in transmitting and/or receiving the data via a 1394 serial bus.

2. Description of the Related Art

Recently, there is noticed widespread application of the IEEE 1394 high performance serial bus (hereinafter referred to simply as 1394 bus) standardized by the IEEE. In such 1394 bus, digital video and audio signals can be transmitted fast together with control commands in real time via a single cable by connecting thereto electronic apparatus such as audio-visual (AV) apparatus and a personal computer.

In transmission of data via a 1394 bus, there are known an asynchronous mode (asynchronous data transmission mode) and an isochronous mode (synchronous data transmission mode) where the data are synchronous with isochronous cycles of 8 kHz (125 μs) generated by a cycle master in the 1394 bus. Commands are transmitted generally in an asynchronous mode, while video and audio signals are normally transmitted in an isochronous mode due to the necessity of real time reproduction.

However, data transmission in the isochronous mode is performed through multi-address communication where a destination of the data is not specified. For this reason, when any video or audio signal to be protected with respect to the copyright is transmitted via a 1394 bus, there arises a problem that some users not permitted by the relevant copyrighter may copy such video or audio signal illegally or may change or modify the copied signal.

SUMMARY OF THE INVENTION

It is therefore an object of the present invention to realize exact prevention of any illegal use of such data.

According to a first aspect of the present invention, there is provided an apparatus for transmitting data in a first or asynchronous mode and a second or isochronous mode. This apparatus comprises a means for ciphering the data to be transmitted by the use of cipher keys; a means for packetizing the ciphered data into packets of the isochronous mode; and a means for transmitting the output of the packetizing means. In this apparatus, transmission of the data is performed in conformity with the IEEE 1394 protocol, and the packetizing means attaches, to a header of the ciphered data, an identification code relative to the ciphering. The cipher keys consist of a session key invariable in each session of the data to be transmitted, and a time variable key updated in each session. Information relative to the time variable key is contained in each packet of the isochronous mode, and information relative to the session key is also contained therein.

According to a second aspect of the present invention, there is provided a method of transmitting data in a first or asynchronous mode and a second or isochronous mode. This method comprises the steps of ciphering the data to be transmitted by the use of cipher keys; packetizing the ciphered data into packets of the isochronous mode; and transmitting the packetized output. In this system, transmission of the data can be executed with enhanced security.

According to a third aspect of the present invention, there is provided an apparatus for receiving data transmitted thereto in a first or asynchronous mode and a second or isochronous mode. This apparatus comprises a means for receiving the transmitted data; a means for depacketizing the output packets obtained from the receiving means; and a means for deciphering the ciphered data outputted from the depacketizing means. In this apparatus, transmission of the data is performed in conformity with the IEEE 1394 protocol, and the depacketizing means separates an identification code relative to the ciphering from the received data. The cipher keys consist of a session key invariable in each session of the data to be transmitted, and a time variable key updated in each session. Information relative to the time variable key is contained in each packet of the isochronous mode, and information relative to the session key is also contained therein. Therefore, the data transmitted with security can be deciphered exactly.

And according to a fourth aspect of the present invention, there is provided a method of receiving data transmitted in a first or asynchronous mode and a second or isochronous mode. This method comprises the steps of receiving the transmitted data; depacketizing the output packets obtained in the receiving step; and deciphering the ciphered data outputted in the depacketizing step.

Thus, it is possible to realize improvements in transmission and reception of the data with enhanced security.

The above and other features and advantages of the present invention will become apparent from the following description which will be given with reference to the illustrative accompanying drawings.

DESCRIPTION OF THE PREFERRED EMBODIMENTS

Hereinafter some preferred embodiments of the present invention will be described in detail with reference to the accompanying drawings.

Figure 1:
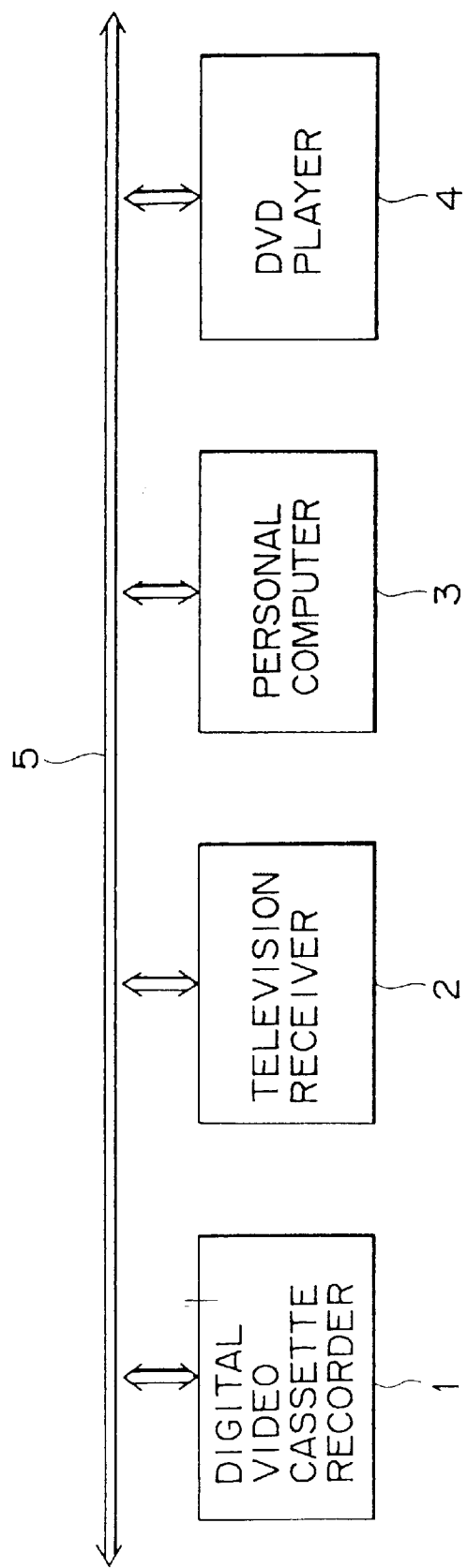
FIG. 1 is a block diagram showing a structural example of a data transmitting/receiving system where the present invention is applied.

FIG. 1 shows a structural example of an information processing system where the present invention is applied. This system comprises a digital video cassette recorder 1, a television receiver 2, a personal computer 3 and a DVD player 4 which are connected mutually via a 1394 bus 5.

Figure 2:
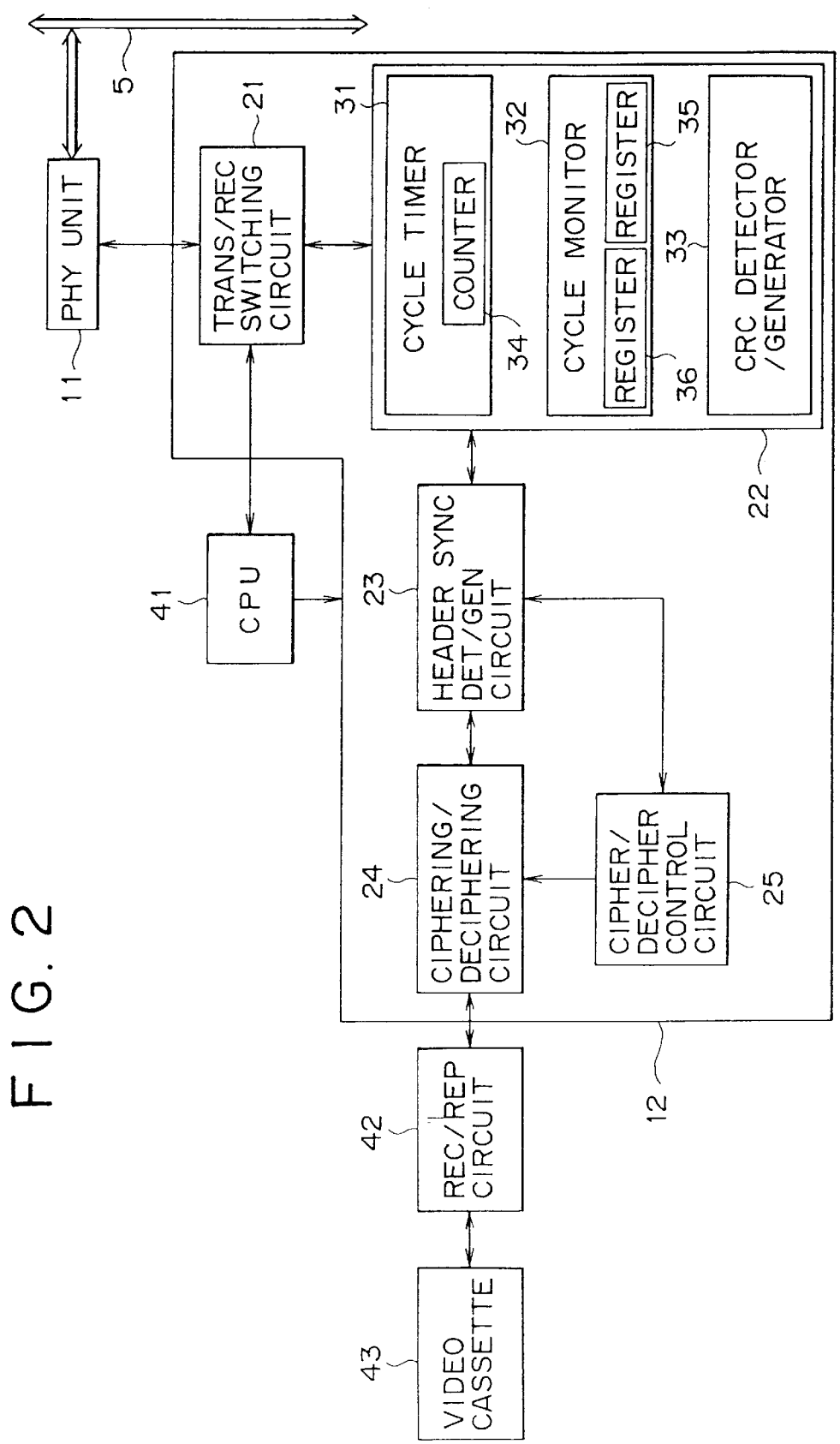
FIG. 2 is a block diagram showing an internal structural example of a digital video cassette recorder in FIG. 1.

FIG. 2 shows an internal structural example of the digital video cassette recorder 1. A PHY unit 11 receives input data transmitted thereto via a 1394 bus 5 and, after demodulating the same, outputs the demodulated data to a transmission/reception switching circuit 21 in a link unit 12. Further the PHY unit 11 demodulates data supplied from the transmission/reception switching circuit 21 to be transmitted, and then outputs the modulated data to the 1394 bus 5.

The transmission/reception switching circuit 21 in the link unit 12 separates the input signal from the PHY unit 11 into packets of an asynchronous mode and packets of an isochronous mode and, after depacketizing the asynchronous-mode packets, outputs the same to a CPU 41. Further the switching circuit 21 depacketizes the isochronous-mode packets and then outputs the same to a timing circuit 22. The asynchronous-mode signal supplied from the CPU 41 is packetized, while the data supplied from the timing circuit 22 are packetized into packets of the isochronous mode and then are outputted to the PHY unit 11.

The timing circuit 22 includes a cycle timer 31, a cycle monitor 32 and a CRC detector/generator 33. The cycle timer 31 has a counter 34 therein. The counter 34 counts predetermined clock pulses and generates a count value which represents the timing of an isochronous cycle of 125 $\mu$s. The cycle monitor 32 includes registers 35 and 36. In the register 35, there is held the destination offset value recorded in the cycle start packet transmitted via the 1394 bus. Meanwhile in the register 36, there is held the value of cycle time data of the cycle start packet.

The CRC detector/generator 33 detects CRC data for error detection and correction from the received data, and then executes a process of error detection and correction by the use of such CRC data. In transmission of the data, the CRC detector/generator 33 executes a process of attaching the CRC data to the data to be transmitted.

At the data reception time, the header sync detecting/generating circuit 23 detects the header and the sync from the data supplied thereto from the timing circuit 22 and, after separating the same, outputs the real data part to the ciphering/deciphering circuit 24. And at the data transmission time, the circuit 23 attaches the header and the sync to the data supplied to the ciphering/deciphering circuit 24 to be transmitted, and then outputs the same to the timing circuit 22.

At the data reception time, the ciphering/deciphering circuit 24 deciphers the supplied data from the header sync detecting/generating circuit 23 under control of the cipher/decipher control circuit 25, and then outputs the deciphered data to the recording/reproducing circuit 42. And at the data transmission time, the circuit 24 ciphers the input data from the recording/reproducing circuit 42 under control of the cipher/decipher control circuit 25, and then outputs the ciphered data to the header sync detecting/generating circuit 23. The cipher/decipher control circuit 25 controls the header sync detecting/generating circuit 23 to attach predetermined identification data to the header or the data, or to extract the same. Further the cipher/decipher control circuit 25 controls the operation of the ciphering/deciphering circuit 24.

At the data reception time, the recording/reproducing circuit 42 modulates the input data from the ciphering/deciphering circuit 24 and then records the modulated data in a video cassette 43. And in a reproduction mode, this circuit 42 reproduces the data recorded in the video cassette 43 and, after demodulating the reproduced data, outputs the same to the ciphering/deciphering circuit 24.

Figure 3:
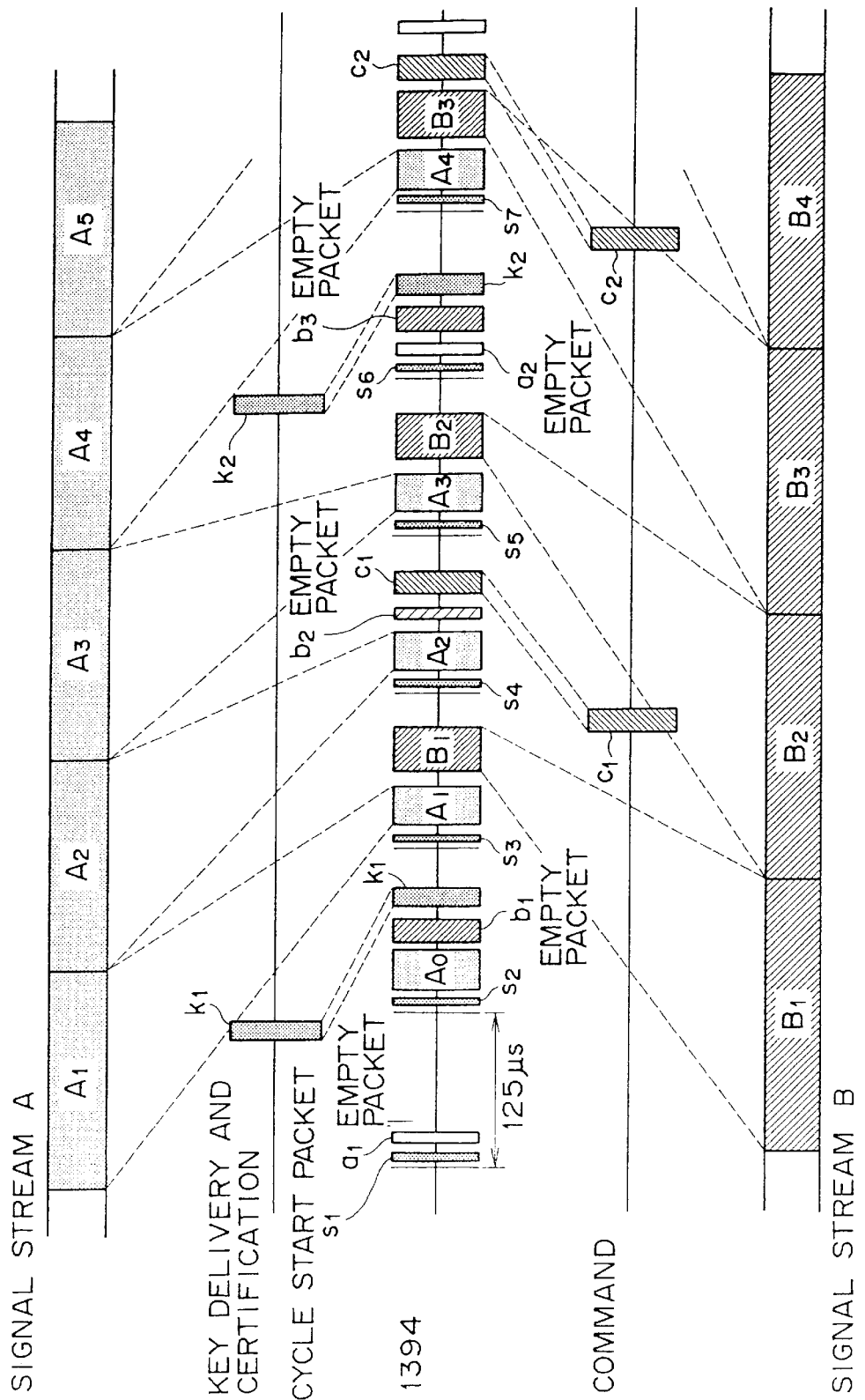
FIG. 3 is an explanatory diagram showing the timing of data transmitted via a 1394 bus.

FIG. 3 shows the timing of data transmitted to the 1394 bus 5. Suppose now that, for example, the digital video cassette recorder 1 reproduces the data from the video cassette 43 and transmits the reproduced data to the television receiver 2. It is also supposed here that the DVD player 4 transmits the data, which have been reproduced from a loaded DVD (disk), to the personal computer 3 via the 1394 bus 5. In this example, it is further supposed that a signal stream A is reproduced from the video cassette 43 and is outputted from the digital video cassette recorder 1, while a signal stream B is reproduced from the DVD and is outputted from the DVD player 4.

Suppose now that the cycle master of the 1394 bus 5 is the digital video cassette recorder 1 for example. In this case, the CPU 41 controls the transmission/reception switching circuit 21 to generate cycle start packets for specifying the 125 $\mu$s isochronous cycles of the 1394 bus 5. The cycle start packets are arrayed as $S_1, S_2, \ldots$ at the heads of isochronous cycles, as shown in FIG. 3.

As will be described later with reference to FIG. 6, cycle time data are arrayed in the cycle start packet. The count value obtained from the counter 34 of the cycle timer 31 is recorded in the cycle time data. Any electronic apparatus other than the cycle master connected to the 1394 bus 5 reads out the cycle time data and holds the same in the register of the internal cycle monitor.

For example, when the cycle master is the personal computer 3 instead of the digital video cassette recorder 1, the personal computer 3 transmits cycle start packets. In this case, the digital video cassette recorder 1 receives, in its PHY unit 11, the cycle start packet transmitted thereto via the 1394 bus 5, and then depacketizes the received packet in its transmission/reception switching circuit 21. Thereafter the depacketized data are inputted to the timing circuit 22. Subsequently in the timing circuit 22, the cycle time data contained in the cycle start packet are read out by the cycle monitor 32, and the read value is held in the register 36. And then, time management of the isochronous cycles on the 1394 bus 5 is performed with reference to the value thus held in the register 36.

In this manner, the time bases of isochronous cycles of the electronic apparatus connected to the 1394 bus 5 are rendered common.

Since the digital video cassette recorder 1 and the DVD player 4 are currently transmitting data via the 1394 bus 5, time slots are allocated thereto at predetermined timing of each isochronous cycle in a manner to enable transmission of isochronous packets. Each of the digital video cassette recorder 1 and the DVD player 4 compresses and packetizes the signal stream A or B, and then transmits the packetized data at the timing of the time slot allocated thereto.

For example, the digital video cassette recorder 1 reproduces the video cassette 43 in its recording/reproducing circuit 42, and then supplies the reproduced data to the ciphering/deciphering circuit 24 for ciphering the data by the use of cipher keys which consist of a session key S and a time variable key i. The ciphered data are supplied to the header sync detecting/generating circuit 23, where the data are compressed and a header is attached thereto. The header-attached data thus obtained are inputted to the timing circuit 22, where a CRC code is further attached to each of the header and the data part.

The data outputted from the timing circuit 22 are supplied to the transmission/reception switching circuit 21 and then are packetized into a packet of the isochronous mode. As described, this packet is transmitted from the PHY unit 11 via the 1394 bus 5 at the timing of the allocated time slot.

Such a process is executed per isochronous cycle as shown in FIG. 3, and signals $A_1, A_2, A_3, \ldots$ of a signal stream A are transmitted as packets, which are denoted by the same reference symbol, at the timing of predetermined time slots of individual isochronous cycles. In any isochronous cycle where none of data to be transmitted is existent, empty packets $a_1, a_2$ are transmitted. In each empty packet, merely a header is existent without any real data part.

An operation similar to the above is performed in the DVD player 4 also, so that signals $B_1$, $B_2$, . . . of a signal stream B are transmitted as packets, which are denoted by the same reference symbol, at the timing different from the signal stream A.

For example, when the CPU 41 transmits a command, the command is inputted to the transmission/reception switching circuit 21. Then this circuit 21 packetizes the command into a packet of the asynchronous mode and transmits the same as $C_1$, $C_2$ or the like, as shown in FIG. 3.

Such asynchronous packet is transmitted in accordance with requirement, and is not generated always in each isochronous cycle.

Similarly, as will be described later, the CPU 41 transmits a session key S, which is one of cipher keys, in an asynchronous packet.

In this manner, the signal stream A transmitted via the 1394 bus 5 is received by the television receiver 2, while the signal stream B is received by the personal computer 3. Suppose now that, for the sake of explanatory convenience, the signal stream A is received by the digital video cassette recorder 1 shown in FIG. 2. In this case, the following operation is performed.

The PHY unit 11 receives the packets transmitted thereto via the 1394 bus 5 and then supplies the same to the transmission/reception switching circuit 21. Subsequently, this switching circuit 21 separates the input packets into isochronous packets and asynchronous packets, then depacketizes the isochronous packets and outputs the data to the timing circuit 22. The circuit 21 depacketizes the asynchronous packets also and outputs the data to the CPU 41. As a result, for example, the signal stream A is supplied to the timing circuit 22, while the command and the session key S are supplied to the CPU 41.

The CRC detector/generator 33 in the timing circuit 22 supplies the input data to the header sync detecting/generating circuit 23. Subsequently the CRC detector/generator 33 detects the CRC code from the data supplied thereto from the header sync detecting/generating circuit 23, and then executes a process of error detection and correction by the use of such CRC code. Thereafter the error-corrected data are returned to the header sync detecting/generating circuit 23.

The header sync detecting/generating circuit 23 separates the header from the input data and supplies the header information to the cipher/decipher control circuit 25 while supplying the real data part to the ciphering/deciphering circuit 24. The cipher/decipher control circuit 25 detects ciphering identification data included in the header detected by the header sync detecting/generating circuit 23, and then controls the ciphering/deciphering circuit 24 in accordance with the result of such detection. More specifically, when the identification data signifies that the data are ciphered, the control circuit 25 enables the ciphering/deciphering circuit 24 to execute a deciphering process by the use of the cipher key. But when the identification data signifies that the data are not ciphered, such deciphering process is omitted.

The data outputted from the ciphering/deciphering circuit 24 are modulated in a predetermined mode by the recording/reproducing circuit 42 and then are supplied to the video cassette 43 to be recorded therein.

In the embodiment of this invention, cipher keys employed for ciphering and deciphering the data in the ciphering/deciphering circuit 24 consist of a session key S and a time variable key i. The session key S is updated per session (e.g., per movie information or per reproduction). In other words, the session key S has an invariable value within one session, whereas the time variable key i is updated frequently in each session. Thus, higher security can be achieved by the use of a session key S and a time variable key i as cipher keys.

More specifically, even if the session key S is pirated, it is impossible to decipher the ciphered data in case the time variable key i is unknown. Further, even if the time variable key i is also pirated, since the time variable key i is updated every moment, the data are decipherable merely for an extremely short period of time but are rendered not decipherable any longer thereafter.

The session key S is transmitted at predetermined timing in an asynchronous packet, as denoted by $K_1$, $K_2$ in FIG. 3. However, as will be described later, it is a matter of course that the session key S can be transmitted in an isochronous packet similarly to the time variable key i.

Figure 4:
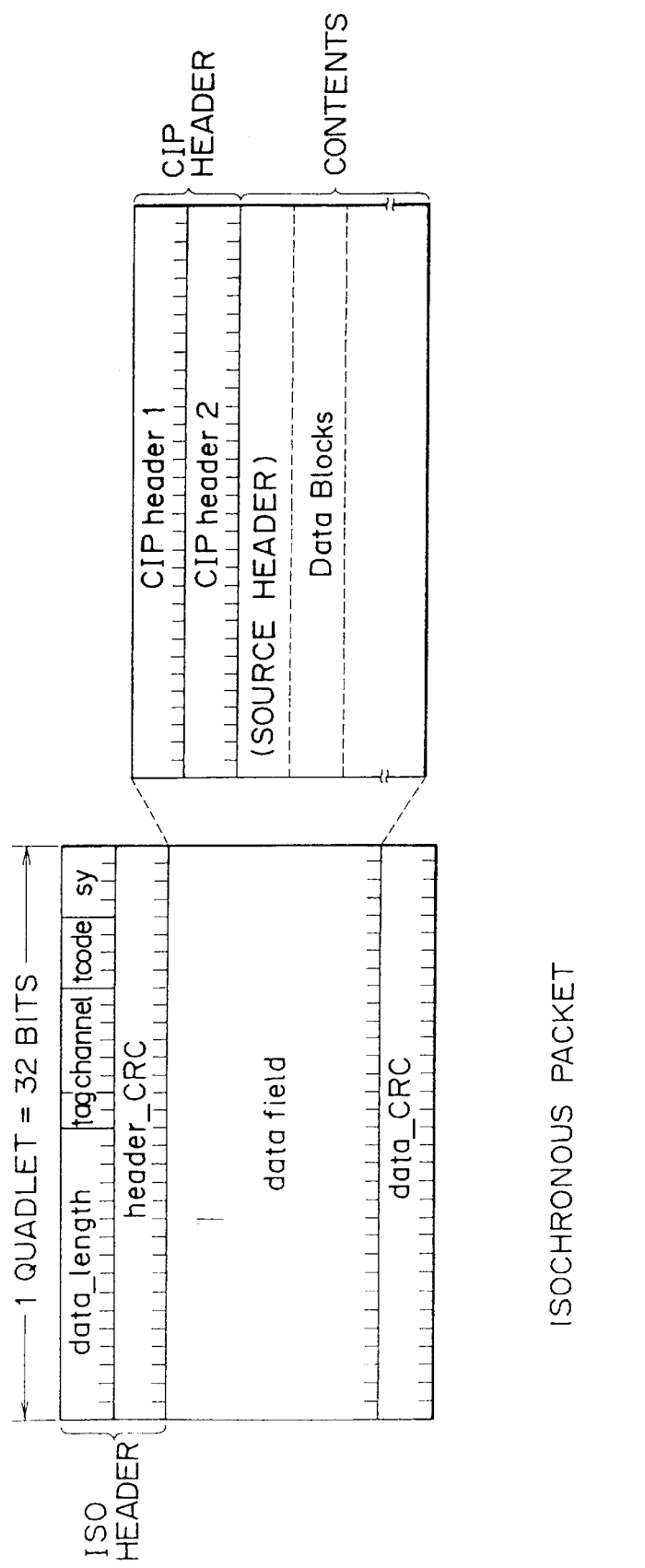
FIG. 4 shows a format of an isochronous packet.

FIG. 4 shows a format of an isochronous packet. As represented in this diagram, first two quadlets are used as an isochronous header. A data length is recorded at the top of this header, and next is recorded a tag which indicates whether a CIP header is attached or not in a data field. Thereafter a channel is disposed next to the tag. This channel is used to identify, for example, a stream A or a stream B in FIG. 3.

In FIG. 4, "tcode" (transaction code) prescribes the format of a packet. In the case of an isochronous start packet, it is set to 1010 (=A). Next "sy" denotes a synchronization code which is prescribed per application. In the embodiment of this invention, two bits of the time variable key i composed of 32 to 40 bits are disposed in the two lower-order bits of the synchronization code "sy". For example, when the time variable key i is composed of 32 bits, a total of 16 packets completely constitute the time variable key i. A flag, which signifies that the relevant packet is the top one or not of the time variable key i, can be attached to the third bit from the LSB of the code "sy". For example, this third bit is set to 1 in case the relevant packet is the top one of the time variable key i, or it is set to 0 in the other case.

When the time variable key i is recorded as described in the synchronization code "sy", a value 1100 (=C) may be set in "tcode" to serve as an identification code of the time variable key i.

The cipher/decipher control circuit 25 collects two bits of the time variable key i in each packet from the header information outputted from the header sync detecting/generating circuit 23 and, upon termination of collecting such bits of 16 packets, transfers the completed time variable key i to the ciphering/deciphering circuit 24.

As shown in FIG. 4, the second quadlet of the isochronous header is used as a header CRC. And a CIP header corresponding to two quadlets is disposed in the next data field of the isochronous header, and contents are disposed thereafter. The contents represent ciphered data, as described above.

According to the MPEG standard, a source header is disposed in the area of such contents. In this case, any source header with a time stamp or the like recorded therein is not ciphered.

Data CRC is disposed next to the data field.

Figure 5:
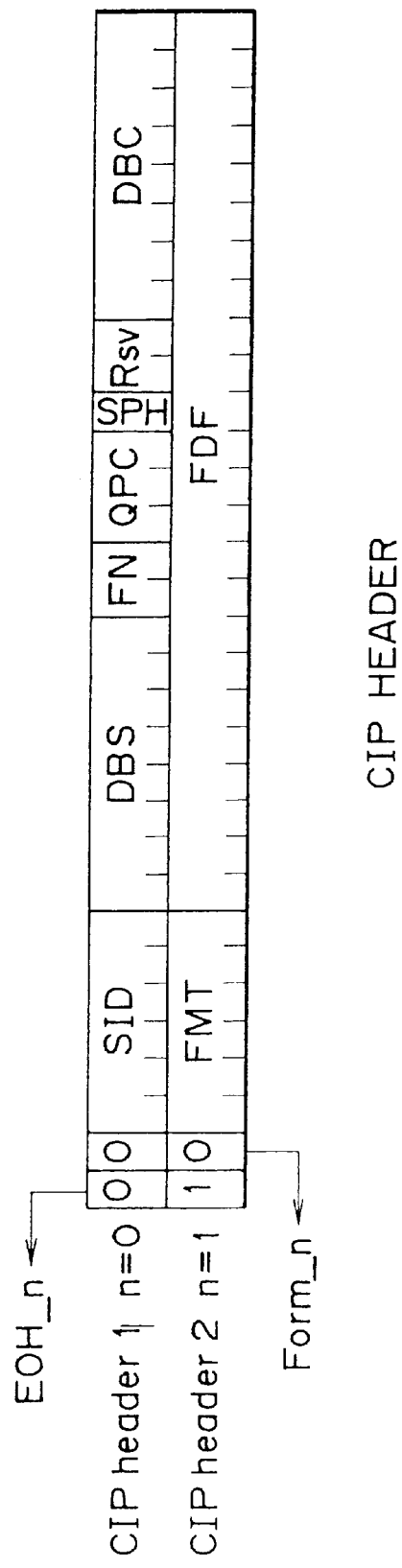
FIG. 5 shows a format of a CIP header.

FIG. 5 shows a detailed structure of a CIP header. As represented in this diagram, a bit (=0) signifying the top of the header is disposed at the top thereof in the first CIP header 1 out of headers of two quadlets, while a bit 1 is disposed in the second CIP header 2. More specifically, the first bit serves as "EOH_n" (End of CIP header) signifying whether this quadlet is the last or not of the CIP header. This value is set to 0 when any other quadlet follows, or to 1 when it is the last quadlet of the CIP header.

The second bit serves as "Form_n" which represents, in combination with "EOH", the quadlet of the CIP header field. In the embodiment of the present invention, this bit is set to 1 in the case of ciphered data, or to 0 in the case of non-ciphered data.

The third to eighth bits of the CIP header 1 serve as "SID" (Source node ID), and "DBS" (Data block size in quadlets) is disposed next to "SID". This "DBS" represents the block size of the data. And "FN" (Fraction number) disposed next represents the number of blocks into which one source packet is divided. Next "QPC" (Quadlet padding count) represents the number of dummy quadlets attached. And "SPH" (Source packet header) disposed next signifies whether the source packet has a source packet header or not.

An area "Rsv" is reserved for the future, and "DBC" represents the count value of successive data blocks for detecting the data block loss.

"FMT" represents a Format ID, and "FDF" represents a Format dependent field.

Figure 6:
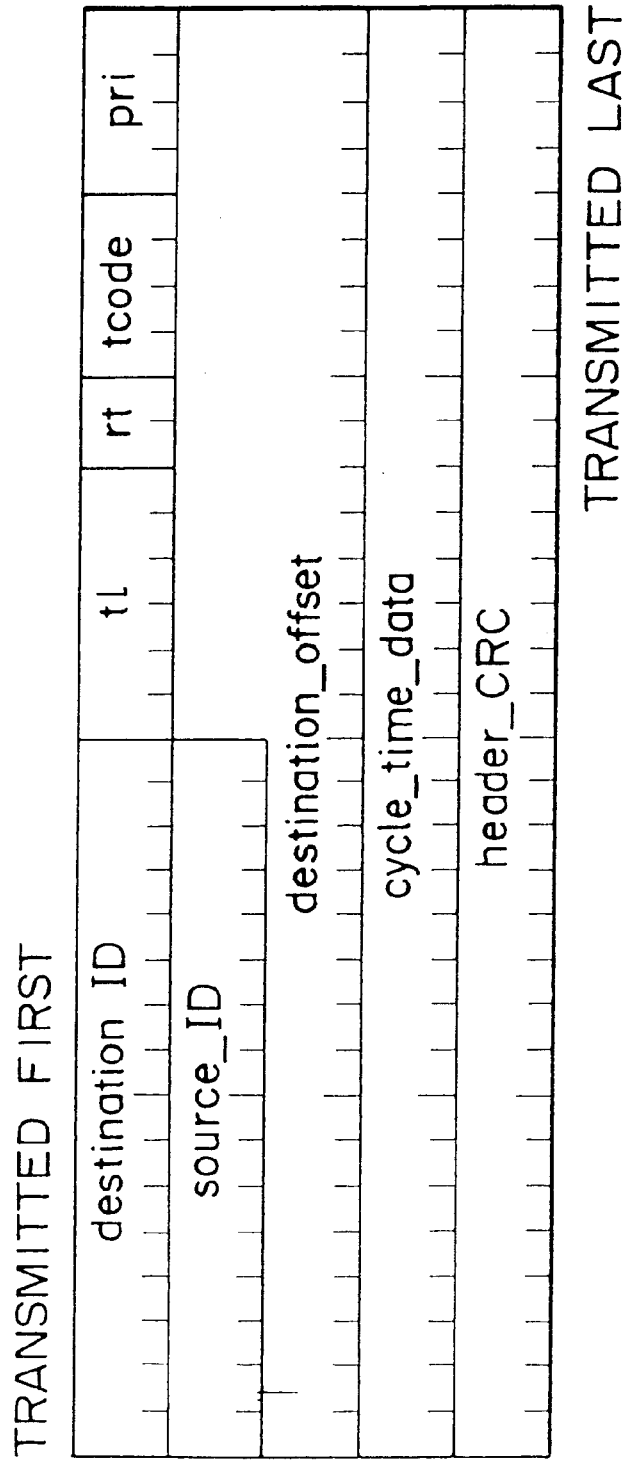
FIG. 6 shows a format of a cycle start packet.

FIG. 6 shows a format of a cycle start packet. At the top of this packet, there is disposed "destination_ID" which represents ID of a data destination. Each bit of next "tl" (transaction label) is set normally to 0. And the value of the time variable key i for example can be recorded here.

Each bit of "rt" (retry code) is set normally to 0. And a packet type transaction code is disposed in next "tcode" (transaction code).

An area "pri" stands for priority, and each bit thereof is set to 1 when used between apparatus connected mutually via the 1394 bus 5. The time variable key i can be allocated to this "pri" also.

ID of a data source is recorded in "source_ID", and a clock value corresponding to the timing deviation from the cycle start packet is set in "destination_offset". And a register value used as a reference for the cycle master as described is set in "cycle_time_data". The time base reference of the isochronous cycle of each electronic apparatus connected to the 1394 bus 5 is set with reference to this clock value. And CRC of the header is disposed in the last area.

In the embodiment mentioned above, the time variable key i is transmitted after being written in the data part or the header of each packet. However, the value of "destination_offset", "cycle_time_data" or "header_CRC" in the cycle start packet may be used directly as the time variable key i.

Since each electronic apparatus reads out such values and holds the same in the registers 35 and 36 of the cycle monitor 32, it is also possible to extract the time variable key i from the values thus held.

Further, the value of "DBC" of the CIP header shown in FIG. 5 or the value of "data_CRC" shown in FIG. 4 may be used directly as the time variable key i.

Thus, according to the data transmitting apparatus and method of the present invention, ciphered data are packetized into packets of an isochronous mode and then are transmitted to a serial bus, whereby data transmission can be performed with enhanced security.

According to the data receiving apparatus and method of the invention, ciphered data obtained by depacketizing the packets of the isochronous mode are deciphered, so that the data transmitted with security can be deciphered exactly.

And according to the data transmitting/receiving system and method of the invention, the data ciphered by the data transmitting apparatus are transmitted after being packetized into packets of the isochronous mode and are received by the data receiving apparatus. Consequently, it becomes possible to realize an improved data transmitting/receiving system where enhanced security is achieved.

Although the present invention has been described hereinabove with reference to some preferred embodiments thereof, it is to be understood that the invention is not limited to such embodiments alone, and a variety of other changes and modifications will be apparent to those skilled in the art without departing from the spirit of the invention.

The scope of the invention, therefore, is to be determined solely by the appended claims.

What is claimed is:

1. Apparatus for transmitting data in asynchronous and isochronous modes to a receiving device, comprising:

ciphering means for ciphering the data to be transmitted in at least the isochronous mode by the use of first and second cipher keys, said first cipher key being a session key that is invariable during a data transmission session, said second cipher key being a time variable key that is updated on a cyclical basis during the data transmission session;

packetizing means for packetizing the ciphered data into packets of the isochronous mode; and transmitting means for transmitting the packets of ciphered data from said packetizing means to the receiving device;

wherein said apparatus transmits updated second key information in a cyclical manner to the receiving device to enable the receiving device to generate the updated time variable key to decipher the ciphered data.

2. The apparatus according to claim 1 wherein said packets of ciphered data are transmitted to the receiving device on a bus in accordance with the IEEE 1394 protocol.

3. The apparatus according to claim 1 wherein said packetizing means attaches, to a header of the ciphered data, an identification code relative to the ciphering.

4. The apparatus according to claim 1 wherein information relative to the time variable key is contained in each packet of the isochronous mode.

5. The apparatus according to claim 1 wherein the information relative to the time variable key is contained in a start packet of the isochronous mode.

6. The apparatus according to claim 1 wherein information relative to the session key is contained in each packet of the isochronous mode.

7. The apparatus according to claim 1 wherein the information relative to the session key is contained in a start packet of the isochronous mode.

8. Method for transmitting data in asynchronous and isochronous modes from a transmitting device to a receiving device, comprising:

ciphering the data to be transmitted in at least the isochronous mode by the use of first and second cipher keys, said first cipher key being a session key that is invariable during a data transmission session, said second cipher key being a time variable key that is updated on a cyclical basis during a data transmission session;

transmitting updated second key information to the receiving device in a cyclical manner to enable the receiving device to generate the updated time variable key;

packetizing the ciphered data into packets of the isochronous mode; and transmitting the packets of ciphered data to the receiving device.

9. The method of claim 8 wherein said packets of ciphered data are transmitted to the receiving device on a bus in accordance with the IEEE 1394 protocol.

10. The method of claim 8 wherein an identification code relative to the ciphering is attached, in said packetizing step, to a header of the ciphered data.

11. The method of claim 8 wherein information relative to the time variable key is contained in each packet of the isochronous mode.

12. The method of claim 8 wherein the information relative to the time variable key is contained in a start packet of the isochronous mode.

13. The method of claim 8 wherein information relative to the session key is contained in each packet of the isochronous mode.

14. The method of claim 8 wherein the information relative to the session key is contained in a start packet of the isochronous mode.

15. Receiving apparatus for receiving data from a transmitting device transmitted in asynchronous and isochronous modes, said receiving apparatus comprising:

receiving means for receiving the transmitted data in packets;

depacketizing means for depacketizing the received data packets;

deciphering means for deciphering the data packets received in at least the isochronous mode by the use of first and second cipher keys, said first cipher key being a session key that is invariable during a data transmission session, said second cipher key being a time variable key that is updated on a cyclical basis during the data transmission session;

wherein said receiving means receives updated second key information on a cyclical basis transmitted by the transmitting device; and said apparatus further comprising generating means for generating the updated time variable key based on said second key information received on a cyclical basis.

16. The receiving apparatus according to claim 15 wherein said packets of ciphered data are received on a bus in accordance with the IEEE 1394 protocol.

17. The receiving apparatus according to claim 15 wherein said depacketizing means extracts an identification code relative to the ciphering from a header of the received data.

18. The receiving apparatus according to claim 15 wherein information relative to the time variable key is contained in each packet of the isochronous mode.

19. The receiving apparatus according to claim 15 wherein the information relative to the time variable key is contained in a start packet of the isochronous mode.

20. The receiving apparatus according to claim 15 wherein information relative to the session key is contained in each packet of the isochronous mode.

21. The receiving apparatus according to claim 15 wherein the information relative to the session key is contained in a start packet of the isochronous mode.

22. Receiving method for receiving data from a transmitting device transmitted in asynchronous and isochronous modes, said method comprising:

receiving the transmitted data in packets;

depacketizing the received data packets;

deciphering the data packets received in at least the isochronous mode by the use of first and second cipher keys, said first cipher key being a session key that is invariable during a data transmission session, said second cipher key being a time variable key that is periodically updated during the data transmission session;

receiving updated second key information on a cyclical basis transmitted by the transmitting device; and generating the updated time variable key based on said second key information received on a cyclical basis.

23. The receiving method according to claim 22 wherein said packets of ciphered data are received on a bus in accordance with the IEEE 1394 protocol.

24. The receiving method according to claim 22 wherein an identification code relative to the ciphering is extracted in said depacketizing step from a header of the received data.

25. The receiving method according to claim 22 wherein information relative to the time variable key is contained in each packet of the isochronous mode.

26. The receiving method according to claim 22 wherein the information relative to the time variable key is contained in a start packet of the isochronous mode.

27. The receiving method according to claim 22 wherein information relative to the session key is contained in each packet of the isochronous mode.

28. The receiving method according to claim 22 wherein the information relative to the session key is contained in a start packet of the isochronous mode.

* * * * *